US012811950B2

(12) United States Patent
Vaccariello et al.

(10) Patent No.: US 12,811,950 B2
(45) Date of Patent: *Nov. 24, 2026

(54) SYSTEMS AND METHODS FOR SHARED ACCOUNT MANAGEMENT

(71) Applicant: The PNC Financial Services Group, Inc., Pittsburgh, PA (US)

(72) Inventors: Minette Vaccariello, Pittsburgh, PA (US); Terry Boring, Pittsburgh, PA (US); Elizabeth Sadoski, Pittsburgh, PA (US); Lindsey Boyko, Pittsburgh, PA (US); Alyssa Ilov, Pittsburgh, PA (US)

(73) Assignee: THE PNC FINANCIAL SERVICES GROUP, INC., Pittsburgh, PA (US)

( * ) Notice: Subject to any disclaimer, the term of this patent is extended or adjusted under 35 U.S.C. 154(b) by 74 days.

This patent is subject to a terminal disclaimer.

(21) Appl. No.: 19/204,780

(22) Filed: May 12, 2025

(65) Prior Publication Data

US 2026/0039666 A1 Feb. 5, 2026

Related U.S. Application Data

(60) Provisional application No. 63/679,002, filed on Aug. 2, 2024.

(51) Int. Cl.
*H04L 9/40* (2022.01)

(52) U.S. Cl.
CPC .................................. *H04L 63/105* (2013.01)

(58) Field of Classification Search
CPC ..................................................... H04L 63/102
See application file for complete search history.

(56) References Cited

U.S. PATENT DOCUMENTS

| | | | | |
|---|---|---|---|---|
| 11,244,757 | B1 * | 2/2022 | Gabay | G06V 40/161 |
| 11,489,842 | B1 * | 11/2022 | Russell | G06Q 20/40 |
| 11,641,357 | B1 | 5/2023 | Babani | |
| 11,706,227 | B2 | 7/2023 | Faitelson | |
| 11,887,129 | B1 * | 1/2024 | Amir | H04L 63/08 |
| 2009/0024663 | A1 * | 1/2009 | McGovern | G06F 21/577 |

(Continued)

OTHER PUBLICATIONS

Huntington Bank—Caregiver Banking, https://www.huntington.com/Personal/online-banking/caregiver-banking (Accessed on Dec. 19, 2024).

*Primary Examiner* — Khang Do
(74) *Attorney, Agent, or Firm* — Finnegan, Henderson, Farabow, Garrett & Dunner, LLP

(57) ABSTRACT

Systems and methods disclosed herein may include providing, to a first user device, information associated with one or more access control options associated with sensitive data. In some embodiments, the access control options provided to the first user device may include a tier selection platform for selecting an access tier associated with an independent entity wherein the tier selection platform may contain at least three tiers and a first tier may include view only access to view and monitor sensitive data associated with the data manager, a second tier may include all tier one access and access to set up alerts and perform limited data operations, and a third tier may permit full access. The systems and methods may further include storing the level of access and permitting the independent entity to access the sensitive data through a second user device.

20 Claims, 7 Drawing Sheets

(56) References Cited

U.S. PATENT DOCUMENTS

| | | | | |
|---|---|---|---|---|
| 2014/0172714 | A1* | 6/2014 | Edwards | G06Q 20/405 705/44 |
| 2014/0237562 | A1* | 8/2014 | Nandakumar | G06Q 20/4014 726/5 |
| 2014/0257047 | A1* | 9/2014 | Sillay | H04L 63/10 600/595 |
| 2015/0350210 | A1* | 12/2015 | Thibadeau, Sr | H04L 63/0884 726/7 |
| 2018/0262503 | A1* | 9/2018 | Dawson | H04L 9/3239 |
| 2018/0322204 | A1* | 11/2018 | Dintenfass | G06F 16/245 |
| 2020/0104473 | A1* | 4/2020 | Yu | H04L 63/108 |
| 2022/0038430 | A1* | 2/2022 | Fagan | G16H 10/60 |
| 2022/0046207 | A1* | 2/2022 | Kannan | G06F 21/31 |
| 2024/0346164 | A1 | 10/2024 | Trotta | |
| 2024/0354439 | A1 | 10/2024 | Britell | |
| 2024/0362345 | A1 | 10/2024 | Babani | |
| 2025/0080536 | A1* | 3/2025 | Jones | G06F 9/5011 |
| 2026/0039666 | A1* | 2/2026 | Vaccariello | H04L 63/105 |
| 2026/0075061 | A1* | 3/2026 | Vaccariello | H04L 63/105 |
| 2026/0122073 | A1* | 4/2026 | Joshi | H04L 63/105 |

* cited by examiner

SYSTEMS AND METHODS FOR SHARED ACCOUNT MANAGEMENT

BACKGROUND

Individuals with cognitive difficulties attributed to age, illness, or disability may face situations where their health inhibits them from carrying out everyday tasks. In some cases, individuals with cognitive difficulties may be particularly vulnerable, putting them at a significant risk of being targeted for fraudulent activity, such as scams and elder fraud, which was estimated at roughly $3 billion in 2022. As a result, these individuals may increasingly look to their friends or family as caregivers to assist with day-to-day activities.

Because talking about finances may not be easy and may be messy, many caregivers may be ill-prepared to take over someone's finances. In some cases, caregivers only realize at the time of an emergency or health shock that they do not understand their loved-one's assistance needs and have to rush to receive a power-of-attorney or a joint account in order to access accounts and pay bills.

It can also be stressful for an individual with cognitive difficulties to quickly lose their independence, without first building trust with the caregiver. In emergency situations or a during a period of cognitive difficulty, a power-of-attorney can give a caregiver unlimited access to bank accounts and retirement accounts, leaving these individuals feeling helpless about their future circumstances. What is needed is a multi-stage tool for these individuals to maintain control over their information based on the level of trust an individual has with their caregiver, and the particular circumstances surrounding an individual's health.

The present solution overcomes these issues with cognitive difficulties, rushed power-of-attorney, and independence by having a multi-tiered solution that allows users to permit caregivers varying levels of visibility of their account. This solution circumvents prior methods of caregiving while allowing the user to carefully control what information a caregiver has access to. Therefore, the present solution overcomes the existing issues with caregiving systems and provides improved systems and methods for obtaining and controlling personal information.

SUMMARY OF THE DISCLOSURE

In view of the foregoing, embodiments of the present disclosure provide computer-implemented systems and methods for controlling sensitive data. For example, the systems and methods may include receiving, from a first user device, a validation request. The systems and methods may further include authenticating the validation request based on a determination that the user device is permitted to access and control sensitive data associated with a data manager; receiving, from the first user device, a request to access the sensitive data; accessing, from at least one database, the sensitive data; and providing, to the first user device, information associated with one or more access control options associated with the sensitive data. In some embodiments, the access control options provided to the user device may include a tier selection platform for selecting an access tier associated with an independent entity. In some embodiments, the tier selection platform may contain at least three tiers. In some embodiments, a first tier may include view only access to view and monitor sensitive data associated with the data manager, a second tier may include all first tier access and access to set up alerts and an ability to perform limited data operations, and a third tier may permit full access. The systems and methods may further include receiving a selected access control option associated with the independent entity from the first user device; receiving, from a second user device, a request to permit one or more independent entities a level of access to the sensitive data based on the selected access control option; receiving historical data associated with an unreliability factor of the independent entity; storing, in the at least one database, the level of access; and permitting, based on the unreliability factor and the user selected access control options, the independent entity to access the sensitive data through the second user device.

Throughout this disclosure, the phrase "disclosed embodiments," refers to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic. Likewise, the fact that some "disclosed embodiments" are described as exhibiting a feature or characteristic does not mean that other disclosed embodiments cannot share that feature or characteristic.

It is to be understood that both the foregoing general description and the following detailed description are exemplary and explanatory only, and are not restrictive of the disclosed embodiments, as claimed.

BRIEF DESCRIPTION OF THE DRA WINGS

The accompanying drawings, which comprise a part of this specification, illustrate several embodiments and, together with the description, serve to explain the principles and features of the disclosed embodiments. In the drawings.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures may be rearranged, combined, or divided without departing from the envisioned embodiments. Similarly, additional steps may be added, or steps may be removed without departing from the envisioned embodiments. Thus, the materials, methods, and examples are illustrative only and are not intended to be limiting.

Throughout this disclosure, reference will be made "users," "account holders," "data managers," "independent entities," and "caregivers." Accordingly, users and account holders are examples of a data manager while caregivers are an example of an independent entity.

Figure 1:
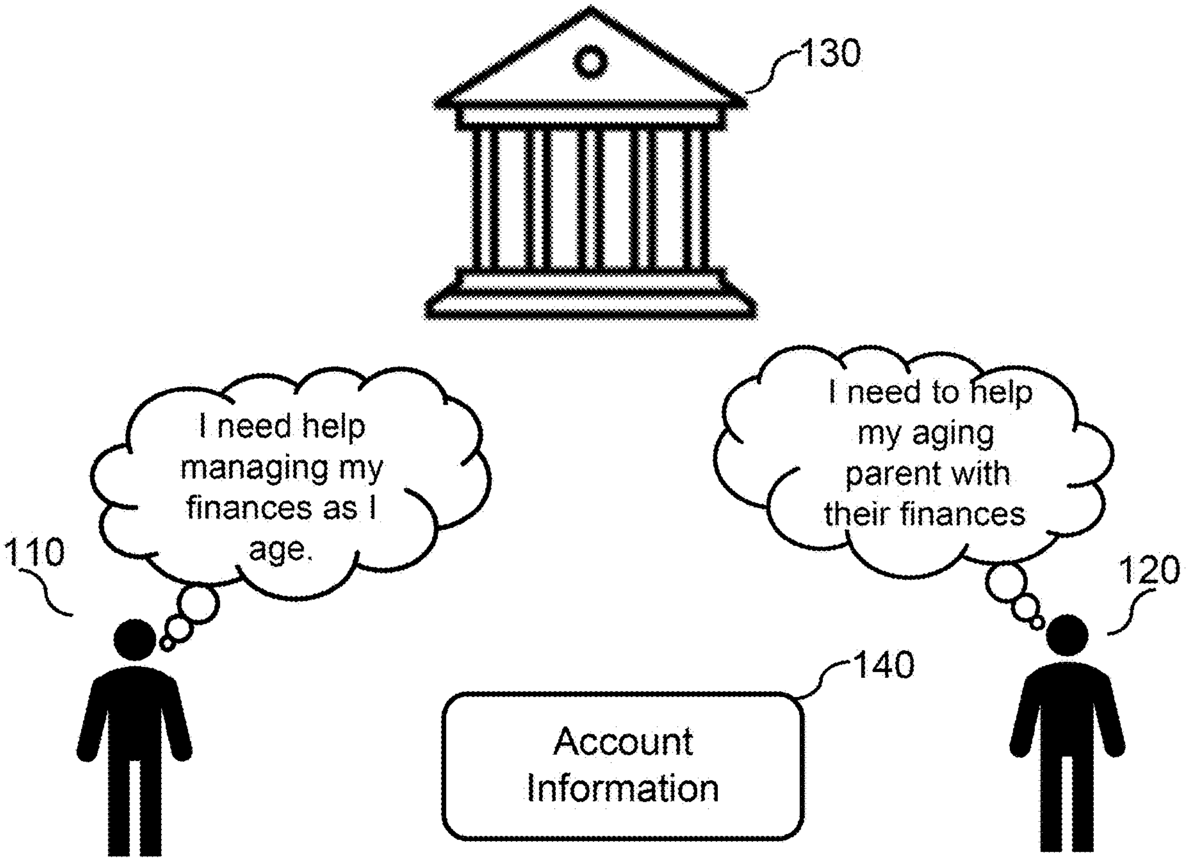
FIG. 1 illustrates a system in which a user considers giving a caregiver access to their account information, consistent with disclosed embodiments.

FIG. 1 illustrates a data manager considering giving an independent entity access to their account information, consistent with disclosed embodiments. As illustrated in FIG. 1, data manager 110 may be either an individual or an entity acting as a data manager requiring assistance from a caregiver. A data manager may include an entity that may be an individual, organization, or computer program that may be responsible for controlling access to data. In FIG. 1, caregiver 120 may be an independent entity, which may be an individual or a corporate entity. Entity 130 may be an institution, bank, person, or other organization.

As illustrated in FIG. 1, data manager 110 may wish to receive assistance from a caregiver 120. Data manager 110 may wish to receive assistance because, in some embodiments, the data manager 110 may be an individual with cognitive difficulties that may be vulnerable to fraudulent activity such as scams or elder fraud. In alternative embodiments the user may be vulnerable to fraudulent activity by their caregiver 120. In alternate embodiments, the data manager 110 may have difficulty with maintaining complete independence over their finances. Entity 130 may be responsible for facilitating the data manager's 110 efforts in granting limited or full access to the user's account information 140 to a caregiver 120.

Figure 2:
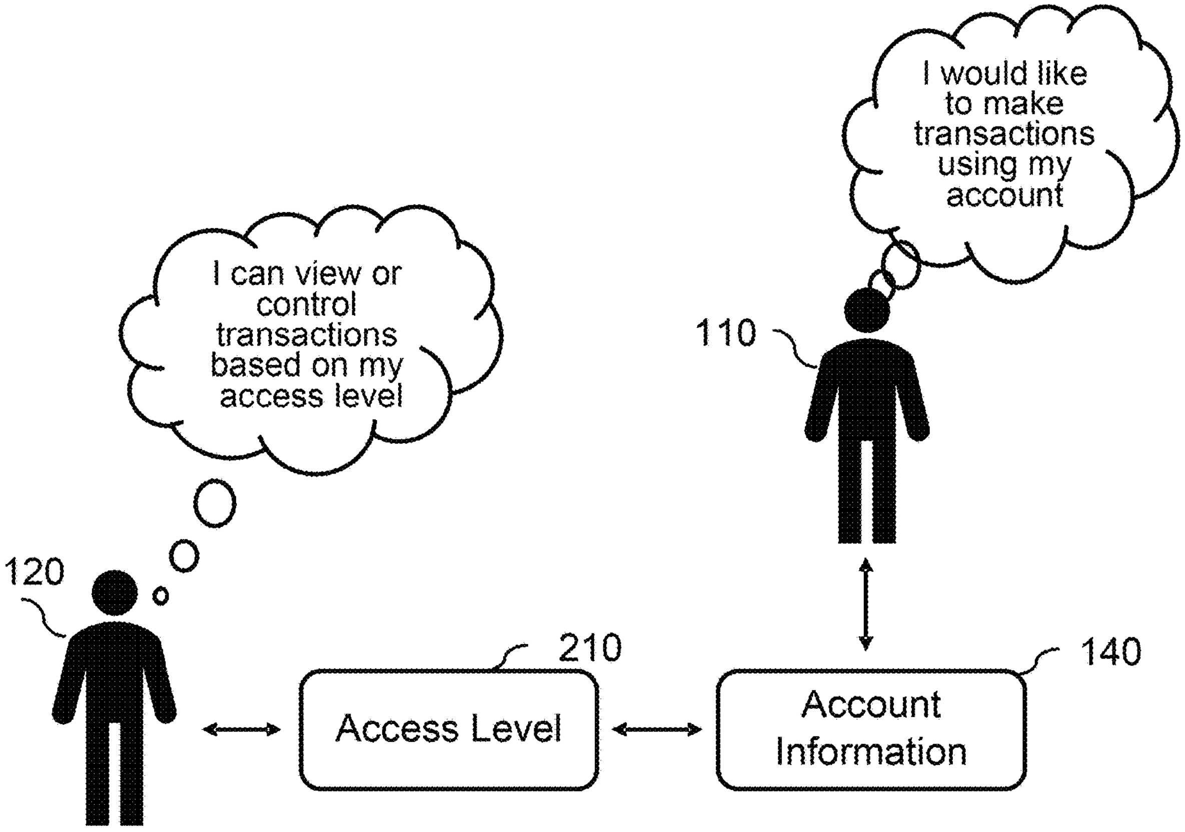
FIG. 2 illustrates a system in which a user, such as a bank account holder, and a caregiver use access controls to view or control information, consistent with disclosed embodiments.

FIG. 2 illustrates a user and caregiver using access controls to view or control information, consistent with disclosed embodiments. As illustrated in FIG. 2, the data manager 110 may be conducting transactions within their account. These transactions may be reflected in the user's account information 140. As further shown in FIG. 2, the caregiver 120 may be able to view or control transactions based on a predetermined access level 210.

In some embodiments the access levels can be defined by a plurality of tiers with the first permitting the lowest level of access and the final tier granting full control.

The illustration provided in FIG. 2 overcomes issues with a data manager's 110 cognitive difficulties, rushed power-of-attorney, and independence by having a multi-tiered solution that allows users to permit caregivers 120 varying levels of visibility of their information, including, in some embodiments, account information. This solution may allow the user to control what information a caregiver has access to. Additionally, a data manager may benefit from a multi-tiered access solution according to disclosed embodiments. For instance, the current solution may be applied in scenarios where an IT administrator assigns different levels of access to employees, or where a social media manager provides varying degrees of access to other users. These users to which access may be granted are referred to herein as "caregivers" to distinguish their role from other users, including users who may grant access to information.

As an example, systems and methods described herein may be applied to bank account information that may be owned by a person or data manager that has or may develop cognitive disabilities. According to the disclosed methods and systems, an independent entity may gain controlled or tiered access to the sensitive data. The tiered access may contain several tiers with access levels ranging from view only to full access. For example, an elderly bank account holder may want to designate tiered access to a trusted caregiver. The account holder may select a tier permitting the caregiver to have limited transaction controls or up to full control of their bank account(s).

Figure 3:
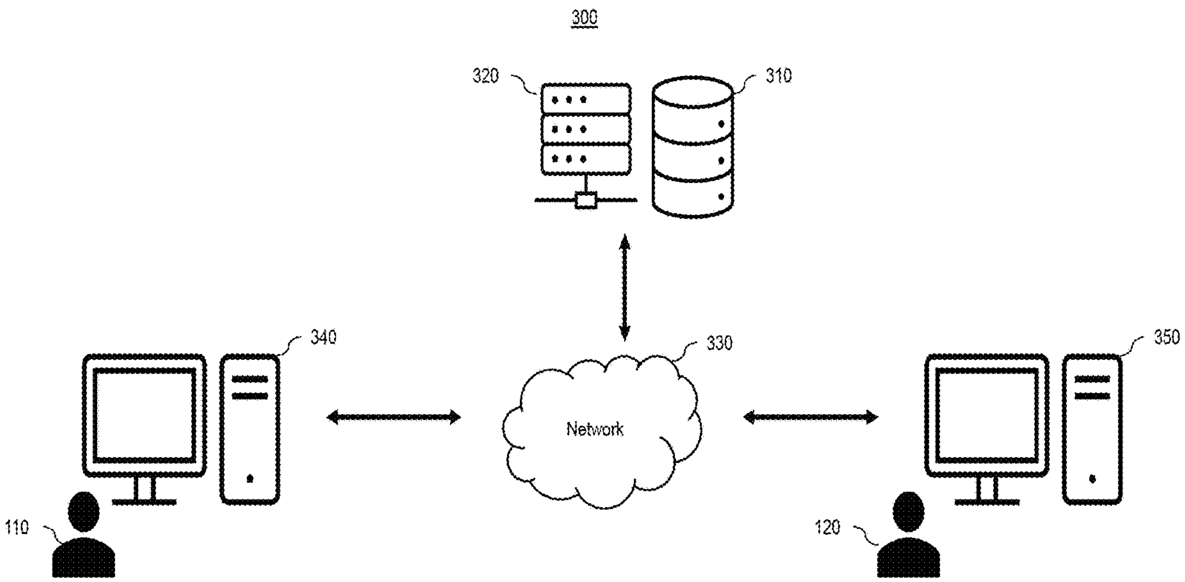
FIG. 3 illustrates an exemplary system for data managers, such as bank account holders, and independent entities, such as independent entities, interacting with a user's account information, consistent with disclosed embodiments.

FIG. 3 is a diagram of an exemplary system for data managers, such as bank account holders, and independent entities interacting with a user's account information, consistent with disclosed embodiments. System environment 300 may include one or more data manager devices 340, one or more computing devices 320, one or more independent entity devices 350, and one or more databases 310, as shown in FIG. 3.

The various components of system 300, such as a data manager device 340 and independent entity device 350, may communicate over a network 330. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system environment 300 is shown as a network-based environment, it is understood that in some embodiments, one or more aspects of the disclosed systems and methods may also be used in a localized system, with one or more of the components communicating directly with each other.

Computing device 320 may include any form of remote computing device configured to receive, store, and transmit data. For example, computing device 320 may be a server configured to store files accessible through a network (e.g., a web server, application server, virtualized server, etc.). Computing device 320 may interact with a database 310, for example, a loan information database, to receive and/or store information. Database 310 may be included on a volatile or non-volatile, magnetic, semiconductor, tape, optical, removable, non-removable, or other type of storage device or tangible or non-transitory computer-readable medium. Database 310 may also be part of computing device 320 or separate from computing device 320. When database 310 is not part of computing device 320, computing device 320 may exchange data with database 310 via a communication link. Database 310 may include one or more memory devices that store data and instructions used to perform one or more features of the disclosed embodiments. Database 310 may include any suitable databases, ranging from small databases hosted on a workstation to large databases distributed among data centers. Database 310 may also include any combination of one or more databases controlled by memory controller devices (e.g., server(s)) or software. For example, database 310 may include document management systems, Microsoft SQL™ databases, SharePoint™ databases, Oracle™ databases, Sybase™ databases, other relational databases, or non-relational databases, such as mongo and others. Although one database 310 is shown in FIG. 3, the system environment 300 may include one or more databases 310, which may be used to store various types of information associated with customers of an institution.

Figure 4:
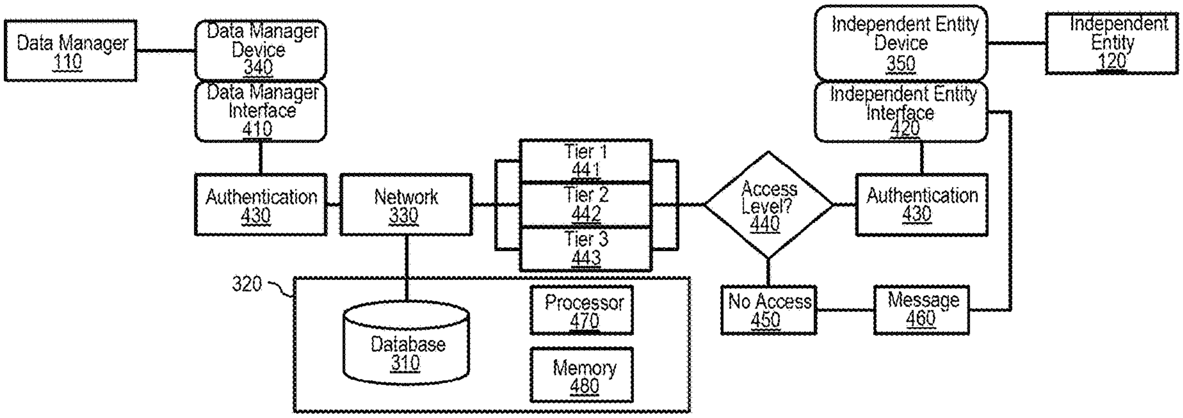
FIG. 4 illustrates an example system environment for allowing an independent entity access to data associated with a data manager, consistent with disclosed embodiments.

FIG. 4 illustrates an example system environment for allowing an independent entity to have controlled access to a data manager's sensitive data, consistent with disclosed embodiments.

As illustrated in FIG. 4, the data manager may interact with its sensitive data that may be in a database. As further illustrated in FIG. 4, the data manager 110 may interact with the sensitive data stored in a database 310 by utilizing a device 340, interface 410, and network 330.

In some embodiments, the data manager's device 340 may include computing devices such as computing device 320. In some embodiments, the interface 410 may be configured to receive input from the data manager's device 340, and one or more components of the data manager's device 340 may perform one or more functions in response to the input received. In some embodiments, the interface 410 may include a touchscreen that includes one or more devices configured to allow data to be received and/or transmitted by system 300 (e.g., a server) and may include one or more dedicated processors and/or memories. The interface 410 may include a screen for displaying communications to a user. For example, the interface 410 may include a display configured to display the information relating to data operations such as transactions within an account. The data manager's device 340 and interface 410 may include other components known in the art for interacting with a data manager 110 and database 310.

As illustrated in FIG. 4, the independent entity 120 may interact with its sensitive data associated with the data manager 110 that may be stored in a computing device 320 that may include a processor (or multiple processors) 470, a memory (or multiple memories) 480, and a database 310. Similar to the data manager device 340 and interface 410, the independent entity 120 may also engage with the database 310 over a network 330 using its own device 350 and interface 420. However, depending on the access level granted by the data manager 110, the independent entity may have varying levels of access to the sensitive data stored in the database. As further illustrated in FIG. 4, the system environment may query the assigned access level 440 associated with an independent entity. According to some embodiments, this may include access levels defined by a plurality of tiers with the first permitting the lowest level of access and the final tier granting full control. For example, the first tier 441 may grant a caregiver 120 the abilities to view account information such as checking account transactions, credit card transactions, savings accounts, upcoming bills, recently paid bills, spending reports, and budget reports. Further first tier features may include granting the caregiver 120 the ability to view and receive alerts relating to fraud concerns and significant drops in funds and request elevated access from the first tier to the second. The second tier 442 may grant the caregiver 120 all the abilities from the first tier in addition to setting alert parameters for transactions or significant drops in an account. For example, the caregiver may set transactions alerts for all transaction greater than $100. After setting that limit, the caregiver may receive notifications for all transactions in excess of $100 by either text, email, phone call, mail, or another communication medium known in the art. Further second tier capabilities may include locking debit or credit cards, permitting or declining potential fraudulent transactions, and performing limited transactions. Limited transactions may include setting up automatic payments, setting up direct deposits, managing the payment of upcoming bills and review recently paid bills, updating a schedule of upcoming bills that includes checks and pre-authorized payments, and accessing deposits and debits in a checking account. Additionally, a second-tier feature may include the ability to request elevated access from the second tier to the third. Alternatively, the caregiver 120 may request down access from the second tier to the first. In some embodiments, the third tier 443 may grant the caregiver 120 full unrestricted access to the account.

According to some embodiments, the present disclosure may be applied to a corporation that grants varying levels of access to view and control sensitive data. This sensitive data may include technical data, sensitive employee data, trade secret data, or other confidential data controlled by an entity. For example, in a corporate context involving data management across research, sales, and business administration, a tiered access system may be implemented to ensure appropriate data security and integrity. The first tier 441 may grant employees the ability to view various types of data, such as research reports, sales reports, and business administration records, while also receiving alerts about data anomalies and requesting elevated access to the second tier. The second tier 442 may include all first-tier capabilities and may add features like setting parameters for data alerts, managing sensitive data access, approving or declining data changes, and performing limited data transactions, such as updating client information, adding new research findings, validating existing data for accuracy, and managing project deadlines. Employees in the second tier may also request access to the third tier for full data management capabilities or downgrade back to the first tier. The third tier 443 may provide unrestricted access to all corporate data, allowing employees to modify, delete, and create new data entries across all domains. This system may ensure that employees have the appropriate level of access based on their roles and responsibilities.

Alternatively, if an independent entity, such a caregiver 120, is not permitted any access to the data 450, the system may generate a message 460 to be displayed on the independent entity's interface 420 indicating that access to data is denied.

According to some embodiments, authentication methods 430 may be used to verify the data manager has access to the sensitive data stored in a database 310. These methods may include password-based authentication, multi-factor authentication, token-based authentication, certificate-based authentication, and biometric authentication. For example, token-based authentication may involve generating a unique token that corresponds to an underlying data set, where the token serves as a reference or abstraction of the original asset while preserving the data set's integrity and confidentiality. Token-based authentication may apply unique identifier generation techniques to create tokens that can be securely stored and transmitted in a computing environment.

Figure 5:
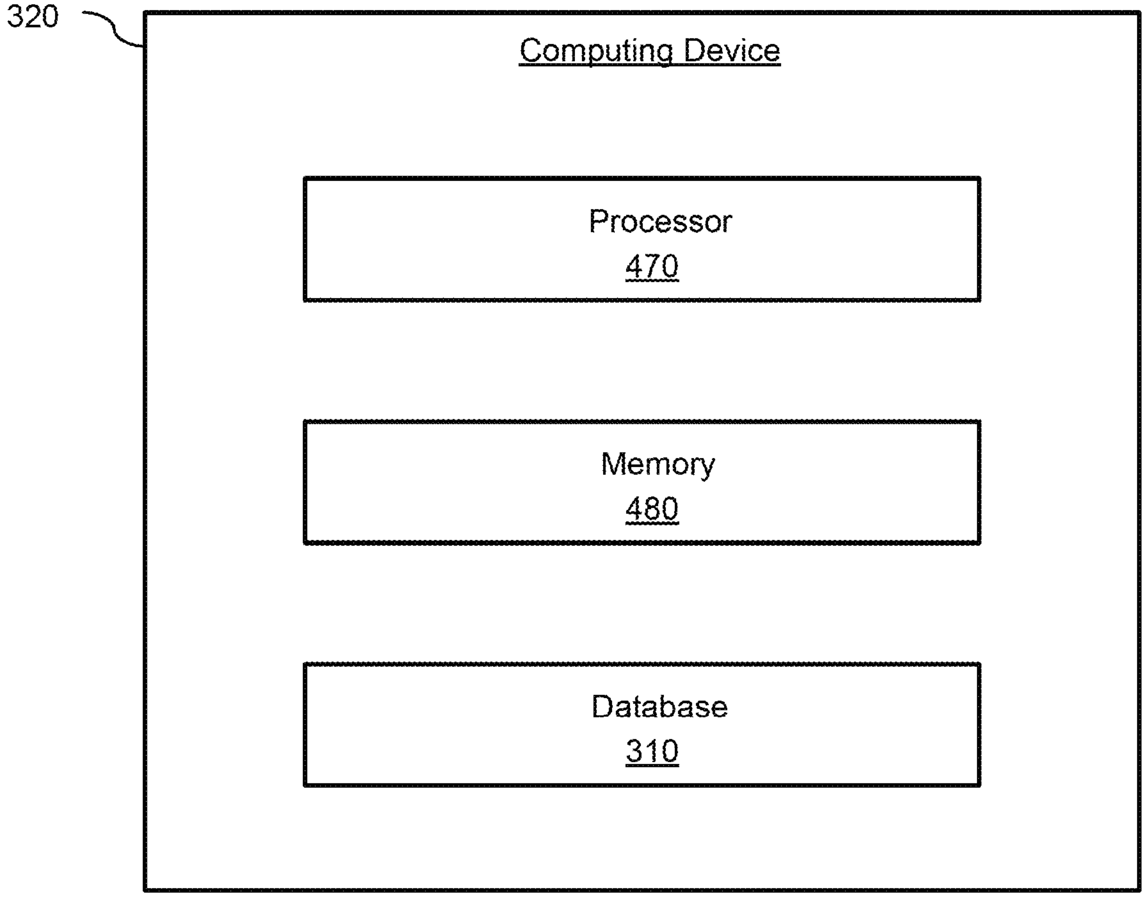
FIG. 5 illustrates an exemplary computing device, consistent with disclosed embodiments.

FIG. 5 is a block diagram showing an example computing device 320, consistent with disclosed embodiments. As described above, computing device 320 may be one or more devices configured to allow data to be received and/or transmitted by system 300 (e.g., a server) and may include one or more dedicated processors and/or memories. For example, computing device 320 may include a processor (or multiple processors) 470, and a memory (or multiple memories) 480, as shown in FIG. 4. Computing device 320 may include one or more digital and/or analog devices that may allow computing device 320 to communicate with other machines and devices, such as other components of system 300. Computing device 320 may include one or more input/output devices. Computing device 320 may include a screen for displaying communications to a user. In some embodiments computing device 320 may include a touch screen. Computing device 320 may include other components known in the art for interacting with a user. Computing device 320 may also include one or more digital and/or analog devices that may allow a user to interact with system 300, such as touch-sensitive area, keyboard, buttons, or microphones.

Processor 470 may take the form of, but is not limited to, one or more integrated circuits (IC), including application-specific integrated circuit (ASIC), microchips, microcontrollers, microprocessors, embedded processor, all or part of a central processing unit (CPU), graphics processing unit (GPU), digital signal processor (DSP), field-programmable gate array (FPGA), server, virtual server, system on an chip (SOC) or other circuits suitable for executing instructions or performing logic operations. Furthermore, according to some embodiments, processor 470 may be from the family of processors manufactured by Intel®, AMD®, Qualcomm®, Apple®, NVIDIA®, or the like. The processor 470 may also be based on the ARM architecture, a mobile processor, or a graphics processing unit, etc. The disclosed embodiments are not limited to any type of processor configured in computing device 320. In some embodiments, processor 470 may be a special purpose processor configured to perform one or more of the operations described below.

Memory 480 may include one or more storage devices configured to store instructions used by the processor 470 to perform functions related to computing device 320. The disclosed embodiments are not limited to particular software programs or devices configured to perform dedicated tasks. For example, the memory 480 may store a single program, such as a user-level application, that performs the functions associated with the disclosed embodiments or may include multiple software programs. Additionally, the processor 470 may, in some embodiments, execute one or more programs (or portions thereof) remotely located from computing device 320. Furthermore, memory 480 may include one or more storage devices configured to store data for use by the programs. Memory 480 may include, but is not limited to a hard drive, a solid state drive, a CD-ROM drive, a peripheral storage device (e.g., an external hard drive, a USB drive, etc.), a network drive, a cloud storage device, or any other storage device.

Computing device 320 may include a database 310 as described above. Database 310 may also be part of computing device 320 or separate from computing device 320. In some embodiments, computing device 320 may include one or more input/output devices, communications devices, displays, and/or other interfaces (e.g., server-to-server, database to-to-database, or other network connections). One or more of institution endpoint devices 340 may include components similar to those discussed with respect to computing device 320 and may perform functions similar to or different from those described above with respect to computing device 320.

Figure 6:
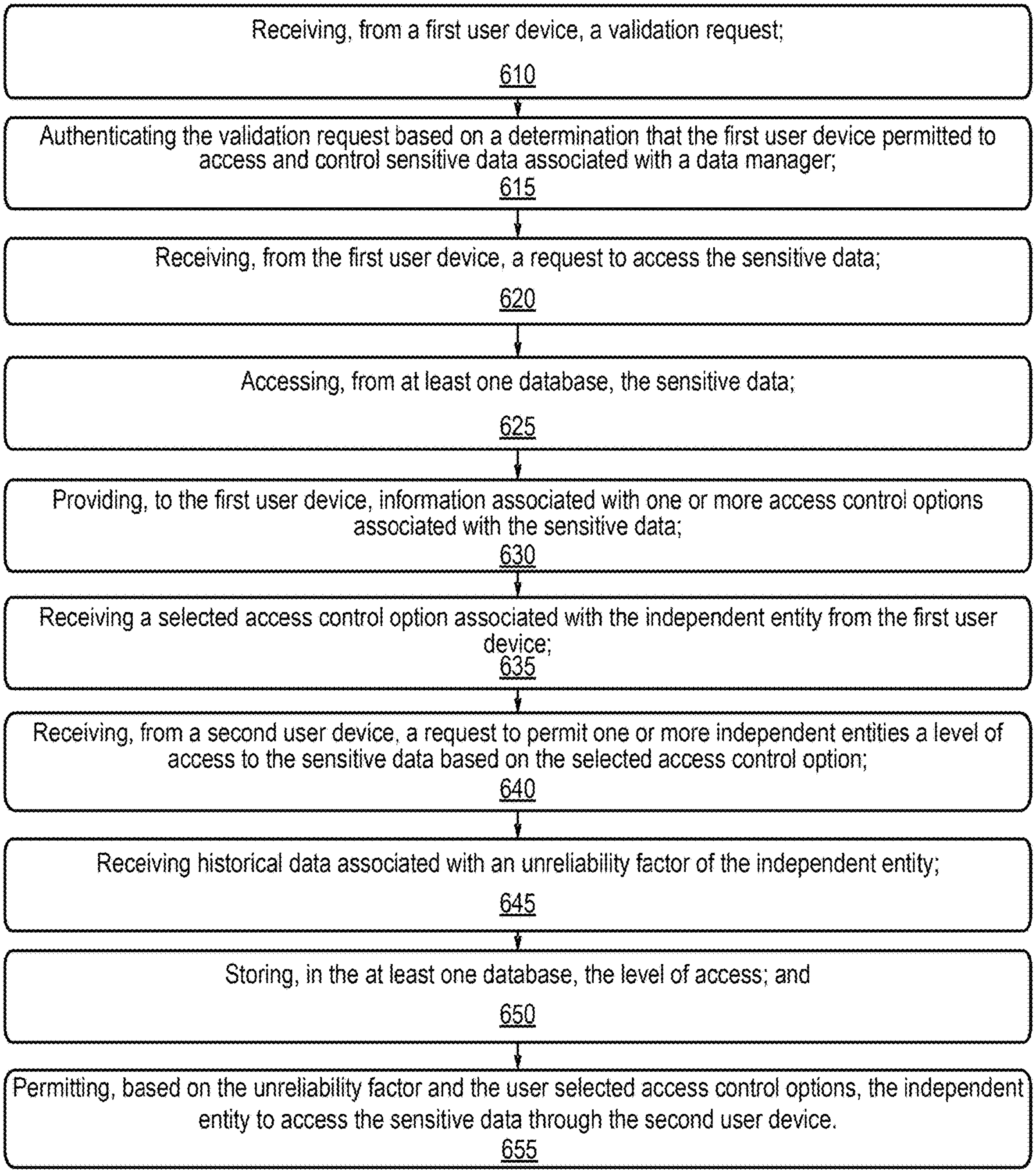
FIG. 6 illustrates an exemplary process for setting access control levels for a caregiver, consistent with disclosed embodiments.

FIG. 6 is a flowchart illustrating an example process for setting access control levels for an independent entity such as a caregiver. At step 610 one or more processors may receive, from a first user device, a validation request. According to some embodiments, the user device may be the data manager device 340.

At step 615, the validation request may be based on a determination that the first user device is permitted to access and control sensitive data associated with a data manager. According to some embodiments, the sensitive data may include information such as transactional data associated with a checking account. According to some embodiments the sensitive data may include technical data, sensitive employee data, trade secret data, or other confidential data controlled by an entity. Further, the data manager may be a user such as an account holder at an institution. According to some embodiments, authentication may occur via tokenization.

At step 620, a request to access the sensitive data may be received from the first user device.

At step 625, a processor may access the sensitive data from at least one database. Access to the sensitive data may be based on one or more permissions held by the processor and may involve the decryption of data stored in the database. In some embodiments, access to sensitive data in the database may be limited to a scope of access associated with a permission or a task. In some embodiments, data stored in the database may be separately encrypted based on associated with a data holder, such that separate decryption may be required to access different users' data. In some embodiments, encryption may be uniform, but access to the database may be restricted to processors with specific permission, such that a user must access data through the processors with specific permission. Access to the processors may be through an application programming interface (API), which may be programmed to distinguish user access and permission based on, for example, login credential information. According to some embodiments the database may be structured in a way described in connection to FIGS. 3, 4, and 5.

At step 630, information associated with one or more access control options associated with the sensitive data may be provided to the first user device. According to some embodiments, the access control options that may be provided to the user device may include a tier selection platform for selecting an access tier associated with an independent entity. Further, the tier selection platform may contain at least three tiers, wherein a first tier may include view-only access to view and monitor sensitive data associated with the data manager, a second tier may include all tier one access and access to set up alerts and perform limited data operations, and a third tier may permit full access.

According to some embodiments, permitting the independent entity access to the sensitive data through a second user device may be based on cognitive attributes of the data manager. For example, as an elderly account holder's health declines, along with their ability to adequately manage their information, the access level of the caregiver may be elevated commensurately. Further, if the elderly account holder has no cognitive issues, a caregiver may have tier 1 or no access to the account holder's data or other information. Alternatively, if the elderly account holder has severe cognitive issues, such as severe dementia, the caregiver may have tier 3 access to the account holder's data.

According to some embodiments, the selected access control option is provided by a medical provider, the data manager, or an individual or organization with authority to report on the cognitive health of the data manager. For example, a medical provider, such as a doctor or psychiatrist, may provide a report of the cognitive health of the data manager. The report may include metrics such as stress levels, cognitive function tests, and overall mental well-being assessments. Based on these findings, the medical provider may recommend specific adjustments to the data manager's access privileges to ensure optimal performance and security.

According to some embodiments, the one or more access control options associated with the sensitive data may include a plurality of selectable access options configured to set specific limits for each selected access option. For example, access settings may be customized, rather than tiered or packaged, by granting specific permissions that fit the need of the data manager's cognitive health. Further, transaction limits may be set more restrictively for a data manager with severe cognitive issues. Selectable access options may also include access at specific times.

According to some embodiments, the cognitive health of the data manager includes the financial health of an organization. For example, the data manager is an organization such as a publicly traded company and the cognitive health of the organization can be described in financial terms. For example, the publicly traded company may transition from being profitable to insolvent. During this transition, access controls to sensitive data may shift to another entity, such as a creditor or parent company.

At step 635, a processor may receive a selected access control option associated with the independent entity from the first user device. The selected access control option may be one of the tiers, which a user may be able to select to control access to sensitive information.

At step 640, a processor may receive a request to permit one or more independent entities a level of access to the sensitive data based on the selected access control through a second user device. For example, after the processor receives the selected access control option, as described in step 635, the independent entity may then request to access the sensitive data commensurate with the selected access control option. In turn, the processor may receive that request.

At step 645, a processor may receive historical data associated with an unreliability factor of the independent entity. According to some embodiments, historical data associated with the unreliability factor of the independent entity may include any information that indicates the responsibility of a caregiver. For example, an institution or account holder may deny a caregiver tiered access to sensitive data if historical data, such as a caregiver's credit score, indicates the caregiver is not responsible. As another example, a company may grant an employee limited access based on previous data usage. Other examples of historical data may include income history, employment history, debt-to-income ratio, account history, spending habits, savings patterns, payment history, and criminal history.

At step 650, the access level may be stored in at least one database. The database may include structure such as the database described in connection to FIGS. 3, 4, and 5.

At step 655, the independent entity may be permitted access the sensitive data through a second user device based on the unreliability factor and the user selected access control options. According to some embodiments, the independent entity may be denied access. For example, an independent entity, such as a caregiver, may have a poor credit score and a criminal history of fraud. Therefore, an institution may not permit the caregiver access despite the data manager's request.

According to some embodiments, the selected access control option associated with the independent entity includes identifying information of the independent entity. For example, when prompting a data manager to select a tier, the request may also prompt for identifying information of the independent entity, such as name, email address, physical address, phone number, or other information. This identifying information may ensure that the selected access control option is given to the correct independent entity.

According to some embodiments, wherein the selected access control option associated with the independent entity is further based on cognitive attributes of the data manager. According to some embodiments, access to the sensitive data may be based on responsibilities of the independent entity. For example, an employee may need access to particular confidential or otherwise sensitive data based on their job role. IT professionals, for example, may need access to technical information, and human resources (HR) professionals may need access to personal information.

According to some embodiments, limited data operations that can be conducted in the second tier may include prohibiting fraudulent activity and approving non-fraudulent data operations. For example, the credit card information of an elderly account holder may have been stolen and used to make a purchase. When this fraudulent charge is then logged, the caregiver may choose to contest the charge or decline the charge and lock the credit card. Alternatively, the caregiver can approve the charge as non-fraudulent.

According to some embodiments, the data manager may receive notifications on data operations performed by the independent entity. For example, if the caregiver declines a seemingly fraudulent transaction or locks the account holder's credit card, the data manager may be alerted via a notification. Further, notifications may include electronic messaging systems including but not limited to email, short message service (SMS), multimedia messaging service (MMS), push notifications, in-app alerts, instant messaging platforms, automated phone calls, or other telecommunication methods.

According to some embodiments, a notification may be sent to the independent entity with details of the data operations when a data operation occurs above a limit. For example, a caregiver may set a limit to be notified of all transaction that occur within an elderly account holder's account that are over $100. Subsequently, if any transaction is made over $100, such as paying a bill or making a purchase, the caregiver may be notified. This ensures that the caregiver stays aware of the account holder's spending habits and helps prevent fraud by enabling them to identify unusual expenditures more effectively.

Figure 7:
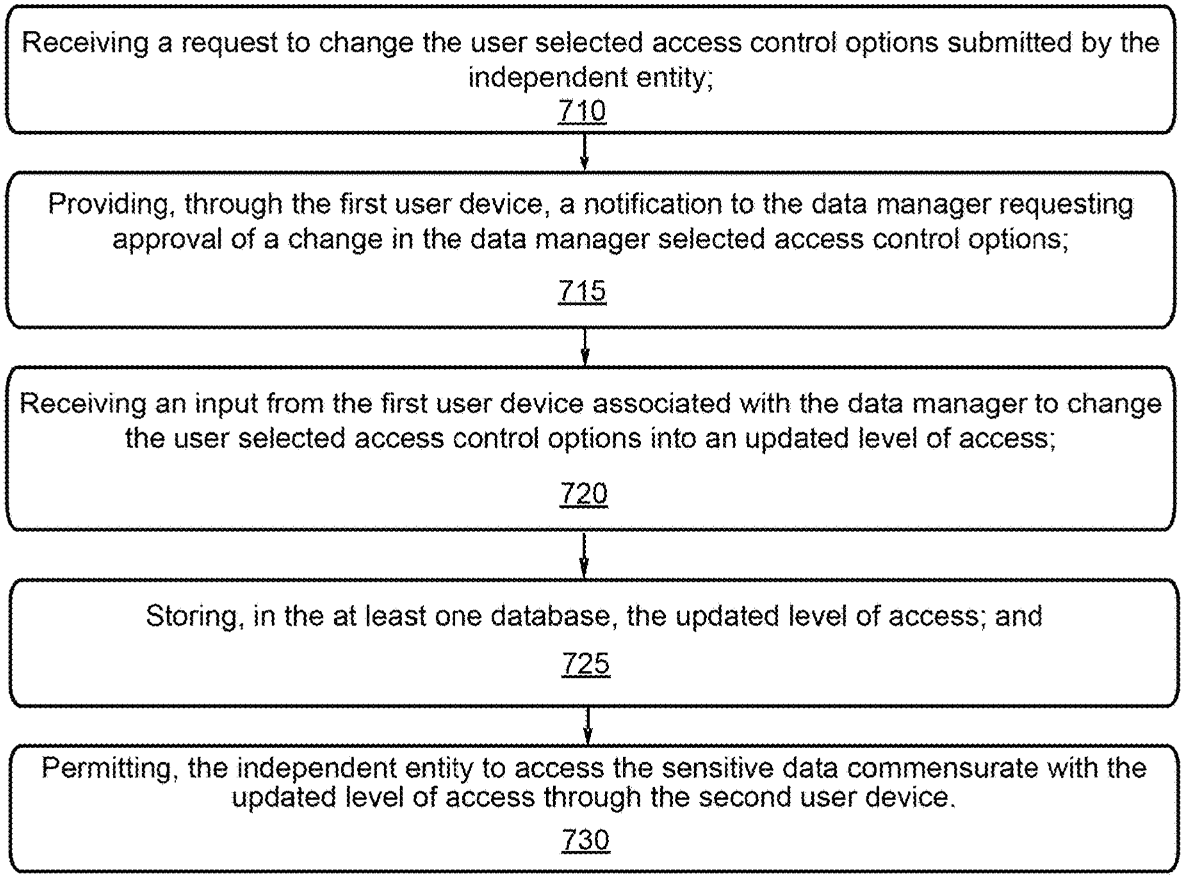
FIG. 7 illustrates an exemplary process for updating access levels, consistent with disclosed embodiments.

FIG. 7 is a flowchart illustrating an example process for updating access levels, consistent with disclosed embodiments. At step 710, a processor may receive a request to change the user selected access control options submitted by the independent entity.

At step 715, a processor may provide a notification to the data manager requesting approval of a change in the data manager selected access control options through the user device. According to some embodiments, the user device may include the data manager device 340.

At step 720, a processor may receive the data manager's input to change the user selected access control options.

At step 725, the updated level of access may be stored in at least one database.

At step 730, the independent entity may be permitted to access the sensitive data commensurate with the updated level of access through a second user device. According to some embodiments, this may include either an elevated level of access, a lower level of access, or the same access depending on the independent entity's request and the data manager's input. For example, an independent entity, such as a caregiver, may make a request for an elevation from tier 1 access to tier 2. A data manager, such as an account holder, may either deny or accept this request in elevation. If denied, the level of access may remain the same at tier 1. If accepted, the caregiver's access may be elevated to tier 2.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions that execute on the computer, other programmable apparatus, or other device implement the functions/acts specified in the flowchart and/or block diagram block or blocks.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A computer-implemented method for controlling sensitive data, the method being performed by one or more processors and comprising:

receiving, from a first user device, a validation request;

authenticating the validation request based on a determination that the first user device is permitted to access and control sensitive data associated with a data manager;

receiving, from the first user device, a request to access the sensitive data;

accessing, from at least one database, the sensitive data;

providing, to the first user device, information associated with one or more access control options associated with the sensitive data;

wherein the access control options provided to the first user device include a tier selection platform for selecting an access tier associated with an independent entity; and wherein the tier selection platform contains at least three tiers, wherein a first tier includes view only access to view and monitor sensitive data associated with the data manager, a second tier includes all first tier access and access to set up alerts and perform limited data operations, and a third tier permits full access;

receiving a selected access control option associated with the independent entity from the first user device;

receiving, from a second user device, a request to permit one or more independent entities a level of access to the sensitive data based on the selected access control option;

receiving historical data associated with an unreliability factor of the independent entity;

storing, in the at least one database, the level of access; and permitting, based on the unreliability factor and the selected access control options, the independent entity to access the sensitive data through the second user device.

2. The method of claim 1, wherein the selected access control option associated with the independent entity is further based on cognitive attributes of the data manager.

3. The method of claim 1, wherein the limited data operations that can be conducted in the second tier include prohibiting fraudulent activity and approving non-fraudulent data operations.

4. The method of claim 1, wherein the data manager receives notifications on data operations performed by the independent entity.

5. The method of claim 1, further comprising:

receiving a request to change the selected access control option submitted by the independent entity;

providing, through the first user device, a notification to the data manager requesting approval of a change in the selected access control option;

receiving an input from the first user device associated with the data manager to change the selected access control option into an updated level of access;

storing, in the at least one database, the updated level of access; and permitting the independent entity to access the sensitive data commensurate with the updated level of access through the second user device.

6. The method of claim 1, the request to permit one or more independent entities the level of access to the sensitive data includes identifying information of the independent entity.

7. The method of claim 6, further comprising providing the independent entity an option to accept the level of access.

8. The method of claim 1, further comprising providing a data operation alert wherein a notification will be sent to the second user device with details of a data operation when the data operation occurs above a limit.

9. A system for controlling sensitive data comprising:

a memory device including program instructions; and at least one processor configured to execute the program instructions to:

receive, from a first user device, a validation request;

authenticate the validation request based on a determination that the first user device permitted to access and control sensitive data associated with a data manager;

receive, from the first user device, a request to access the sensitive data;

access, from at least one database, the sensitive data;

provide, to the first user device, information associated with one or more access control options associated with the sensitive data;

wherein the access control options provided to the first user device include a tier selection platform for selecting an access tier associated with an independent entity; and wherein the tier selection platform contains at least three tiers, wherein a first tier includes view only access to view and monitor sensitive data associated with the data manager, a second tier includes all first tier access and access to set up alerts and perform limited data operations, and a third tier permits full access;

receive a selected access control option associated with the independent entity from the first user device;

receive, from a second user device, a request to permit one or more independent entities a level of access to the sensitive data based on the selected access control option;

receive historical data associated with an unreliability factor of the independent entity;

store, in the at least one database, the level of access; and permit, based on the unreliability factor and the selected access control options, the independent entity to access the sensitive data through the second user device.

10. The system of claim 9, wherein the selected access control option associated with the independent entity is further based on cognitive attributes of the data manager.

11. The system of claim 9, wherein the program instructions further cause the at least one processor to:

receive a request to change the selected access control option submitted by the independent entity;

provide, through the first user device, a notification to the data manager requesting approval of a change in the selected access control option;

receive an input from the first user device associated with the data manager to change the selected access control option into an updated level of access;

store, in the at least one database, the updated level of access; and permit, the independent entity to access the sensitive data commensurate with the updated level of access through the second user device.

12. The system of claim 9, wherein the selected access control option associated with the independent entity includes identifying information of the independent entity.

13. The system of claim 12, wherein the program instructions further cause the at least one processor to provide the independent entity an option to accept the level of access.

14. The system of claim 9, wherein the program instructions further cause the at least one processor to provide a data operation alert wherein when a data operation occurs above a limit, a notification will be sent to the second user device with details of the data operations.

15. A non-transitory computer-readable medium storing a set of instructions for controlling sensitive data, the set of instructions cause at least one processor to:
- receive, from a first user device, a validation request;
- authenticate the validation request based on a determination that the first user device permitted to access and control sensitive data associated with a data manager;
- receive, from the first user device, a request to access the sensitive data;
- access, from at least one database, the sensitive data;
- provide, to the first user device, information associated with one or more access control options associated with the sensitive data;
  - wherein the access control options provided to the first user device include a tier selection platform for selecting an access tier associated with an independent entity; and
  - wherein the tier selection platform contains at least three tiers, wherein a first tier includes view only access to view and monitor sensitive data associated with the data manager, a second tier includes all first tier access and access to set up alerts and perform limited data operations, and a third tier permits full access;
- receive a selected access control option associated with the independent entity from the first user device;
- receive, from a second user device, a request to permit one or more independent entities a level of access to the sensitive data based on the selected access control option;
- receive historical data associated with an unreliability factor of the independent entity;
- store, in the at least one database, the level of access; and
- permit, based on the unreliability factor and the selected access control options, the independent entity to access the sensitive data through the second user device.

16. The non-transitory computer-readable medium of claim 15, wherein the selected access control option associated with the independent entity is further based on cognitive attributes of the data manager.

17. The non-transitory computer-readable medium of claim 15, wherein the set of instructions further cause the at least one processor to:
- receive a request to change the selected access control option submitted by the independent entity;
- provide, through the first user device, a notification to the data manager requesting approval of a change in the selected access control option;
- receive an input from the first user device associated with the data manager to change the selected access control option into an updated level of access;
- store, in the at least one database, the updated level of access; and
- permit, the independent entity to access the sensitive data commensurate with the updated level of access through the second user device.

18. The non-transitory computer-readable medium of claim 15, wherein the selected access control option associated with the independent entity from the first user device further includes identifying information of the independent entity.

19. The non-transitory computer-readable medium of claim 18, wherein the set of instructions further cause the at least one processor to: provide the independent entity an option to accept the level of access.

20. The non-transitory computer-readable medium of claim 15, wherein the set of instructions further cause the at least one processor to: provide a data operation alert wherein when a data operation occurs above a limit, a notification will be sent to the second user device with details of the data operations.

* * * * *